(12) United States Patent
Yang et al.

(10) Patent No.: US 9,067,802 B2
(45) Date of Patent: Jun. 30, 2015

(54) DRAINAGE DEVICE FOR CLOSED CHAMBER CONTAINING LIQUID

(75) Inventors: Ming-Lu Yang, New Taipei (TW); Ya-Dong Zhang, Shenzhen (CN); Tian-En Zhang, Shenzhen (CN); Yue Li, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 770 days.

(21) Appl. No.: 13/242,011

(22) Filed: Sep. 23, 2011

(65) Prior Publication Data

US 2013/0015117 A1 Jan. 17, 2013

(30) Foreign Application Priority Data

Jul. 11, 2011 (CN) .......................... 2011 1 0192156

(51) Int. Cl.
*E02B 15/04* (2006.01)
*C02F 1/00* (2006.01)
*E03F 1/00* (2006.01)
*F04B 53/12* (2006.01)

(52) U.S. Cl.
CPC ................. *C02F 1/00* (2013.01); *F04B 53/121* (2013.01); *F04B 53/123* (2013.01); *E03F 1/006* (2013.01)

(58) Field of Classification Search
None
See application file for complete search history.

(56) References Cited

U.S. PATENT DOCUMENTS

| 2,055 | A | * | 4/1841 | Reed | 417/553 |
| 17,820 | A | * | 7/1857 | Holly | 417/550 |
| 1,859,394 | A | * | 5/1932 | Holladay | 417/260 |
| 7,514,006 | B1 | * | 4/2009 | Lundquist | 210/723 |
| 8,216,462 | B2 | * | 7/2012 | O'Brien et al. | 210/200 |

* cited by examiner

*Primary Examiner* — Terry Cecil
(74) *Attorney, Agent, or Firm* — Novak Druce Connolly Bove + Quigg LLP (57) ABSTRACT

A drainage device includes a closed chamber, a liquid pumping mechanism, and a liquid discharge mechanism. The drainage device can also include a controller. The closed chamber may be filled with liquid and gas for discharge. The liquid pumping mechanism pumps the liquid in the closed chamber, and prevents the liquid in the liquid pumping mechanism from flowing back to the closed chamber. The liquid discharge mechanism discharges the liquid in the liquid pumping mechanism to the outside, and prevents outside air from flowing into the closed chamber.

12 Claims, 6 Drawing Sheets

DRAINAGE DEVICE FOR CLOSED CHAMBER CONTAINING LIQUID

CROSS-REFERENCE TO RELATED APPLICATIONS

This application is related to two co-pending U.S. patent applications, which are: application Ser. No. 13/242,006, application Ser. No. 13/242,026, and all entitled "DRAINAGE DEVICE FOR CLOSED CHAMBER CONTAINING LIQUID". In the aforementioned co-pending applications, the inventors are Yang et al. Such co-pending applications have the same assignee as the present application. The disclosure of the above identified applications are incorporated herein by reference.

BACKGROUND

1. Technical Field

The present disclosure generally relates to drainage devices, and particularly, to a drainage device for draining liquid out of a closed chamber.

2. Description of the Related Art

In the discharge of sewage, sewage is generally sucked into a container to be purified by a sewage suction cleaner, and is then discharged to the outside. The sewage suction cleaner includes a closed chamber and an air pump. The closed chamber achieves a certain degree of vacuum by using the air pump. Under negative air pressure, the sewage is pushed into the closed chamber. However, when discharging the sewage, outside air will flow into the closed chamber via the sewage discharging outlet, and thus the degree of vacuum in the closed chamber is decreased. As a result, the air pressure difference between the inside and the outside of the closed chamber is not sustained, and the sewage is not forced into the closed chamber as expected.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
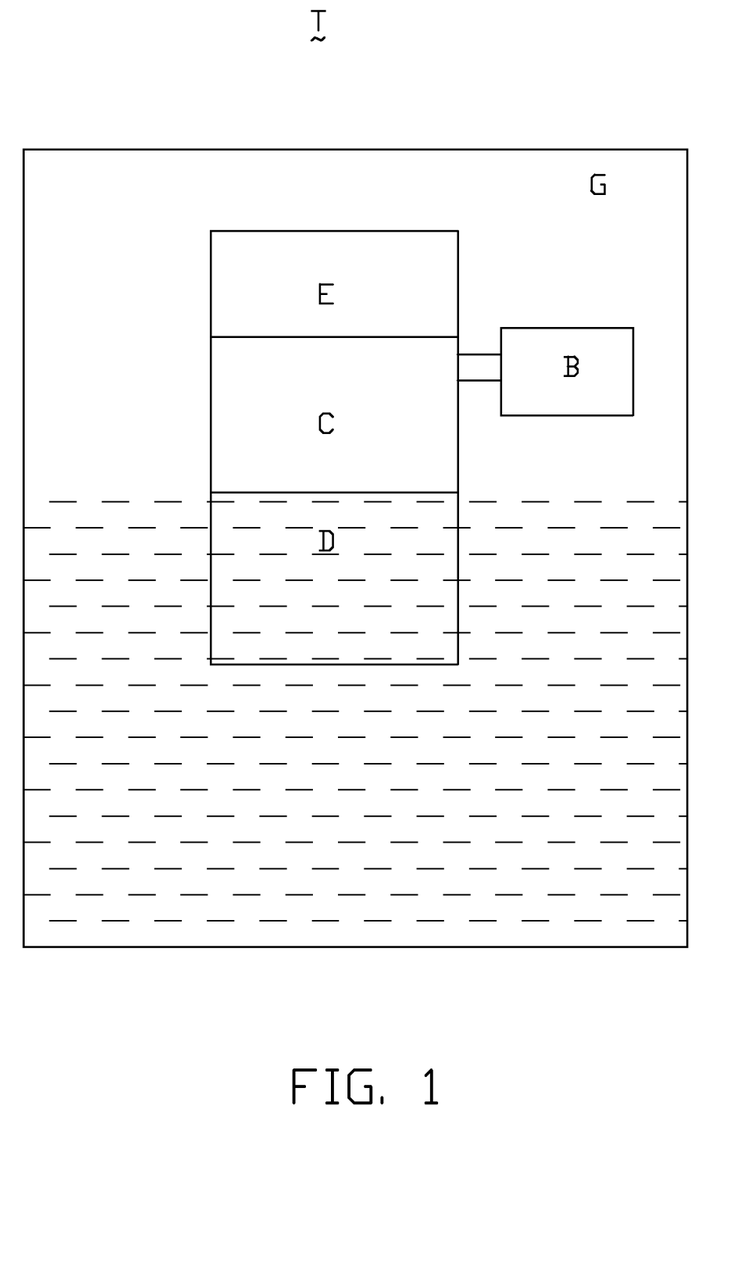
FIG. 1 is a schematic view of a drainage device of present disclosure.

Referring to FIG. 1, a drainage device T of an embodiment of the present disclosure includes a closed chamber G, a liquid pumping mechanism (not labeled), and a liquid discharge mechanism E. The liquid pumping mechanism includes a drive assembly B, a main body C, and a sealing assembly D communicating with the main body C. The liquid pumping mechanism can pump the liquid in the closed chamber G, which is discharged to the outside by the liquid discharge mechanism E. The liquid discharge mechanism E also prevents outside air from entering the closed chamber G. The liquid pumping mechanism can also prevent pumped air from flowing back to the closed chamber G.

The closed chamber G is filled with a certain volume of liquid and gas with a certain degree of vacuum. The telescopic assembly C has a telescopic chamber (not shown). The sealing assembly D is below the surface of the liquid in the closed chamber G. The sealing assembly D allows the liquid in the closed chamber G to flow to the telescopic assembly C, and prevents the liquid in the telescopic assembly C from flowing back to the closed chamber G. When the liquid level in the closed chamber G exceeds a predetermined level, the drive assembly B activates the liquid discharge mechanism E to adjust the volume of the liquid in the telescopic chamber, and thus create or increase a difference in air pressure between the telescopic chamber and the closed chamber G. When the air pressure of the telescopic chamber is lower than that of the closed chamber G, the liquid in the closed chamber G is pressured into the telescopic assembly C, and discharged out of the telescopic assembly C via the liquid discharge mechanism E. Therefore, the closed chamber G can maintain a predetermined liquid level by discharging any excess liquid, and the degree of vacuum in the closed chamber G is kept the same all the time.

Figure 2:
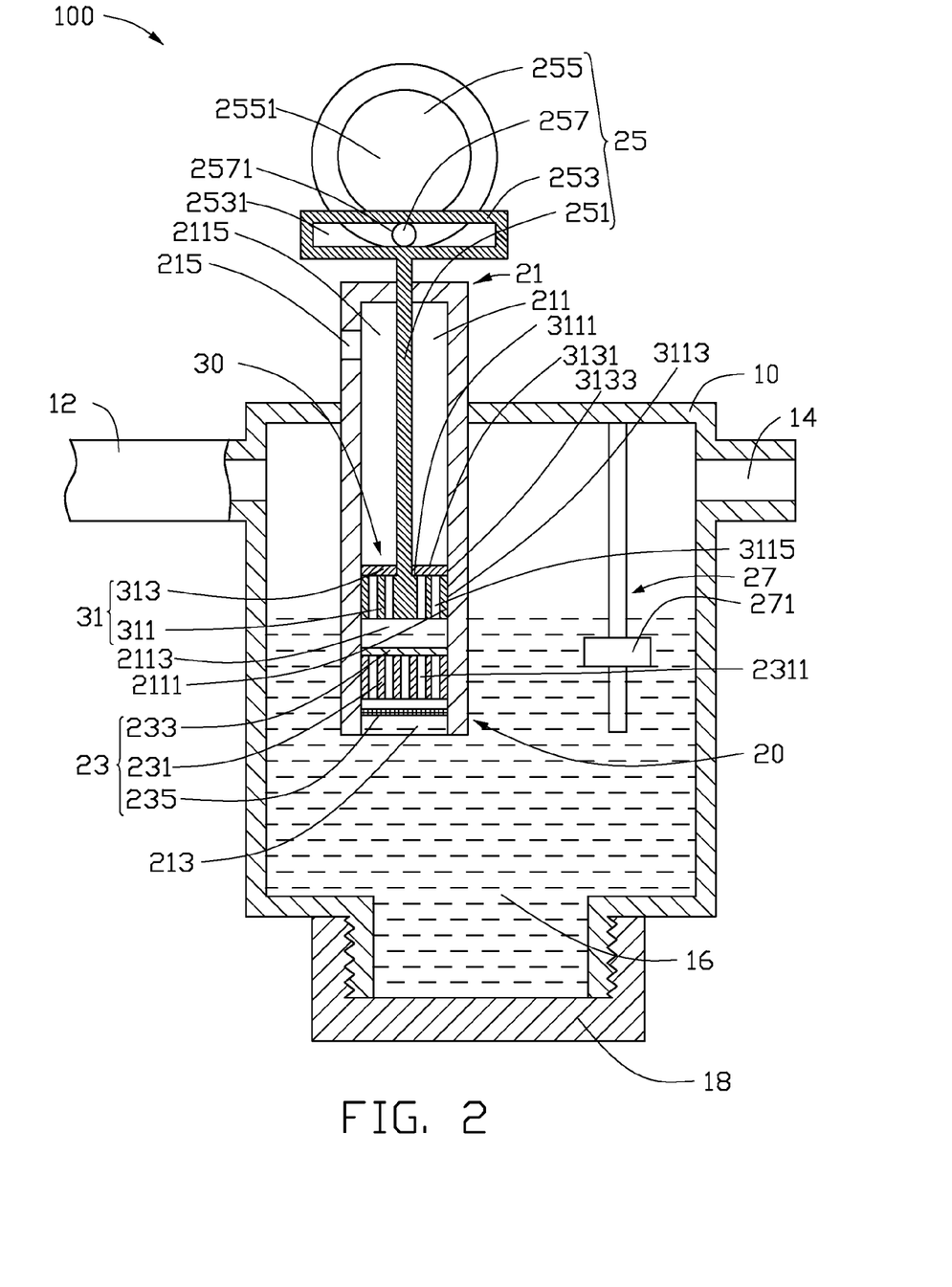
FIG. 2 is a sectional view of a first embodiment of a drainage device operating in a first state.

Referring to FIG. 2, a first embodiment of a drainage device 100 includes a closed chamber 10, a liquid pumping mechanism 20, and a liquid discharge mechanism 30. The liquid pumping mechanism 20 includes a telescopic assembly 21, a first sealing assembly 23, a drive assembly 25, and a controller 27. The liquid discharge mechanism 30 includes a second sealing assembly 31.

The closed chamber 10 defines a fluid channel 12 and a gas channel 14 in the top end, and a slag discharge hole 16 in the bottom end thereof. The closed chamber 10 further includes a sealing cover 18 over the slag discharge hole 16. The fluid channel 12 is used for liquid flow, and is equipped with a flow control valve (not shown). The gas channel 14 is connected to an air pump (not shown) for producing a certain degree of vacuum in the closed chamber 10.

The telescopic assembly 21 is substantially cylindrical, and defines a telescopic chamber 211. One end of the telescopic assembly 21 defines a liquid inlet 213 communicating with the telescopic chamber 211, and the other end of the telescopic assembly 21 is closed. The telescopic assembly 21 further defines a plurality of liquid discharge holes 215 in a sidewall 2111 thereof. The liquid inlet 213 is below the level of the liquid in the closed chamber 10. The liquid in the telescopic chamber 211 may be discharged outside the closed chamber 10 via the liquid discharge holes 215.

The first sealing assembly 23 is positioned in the telescopic chamber 211 and adjacent to the liquid inlet 213. The first sealing assembly 23 includes a fixed piston 231, a flexible member 233, and a filter 235. The flexible member 233 and the filter 235 are positioned on the top and the bottom of the fixed piston 231, respectively. The fixed piston 231 defines a plurality of permeable holes 2311, so that any liquid in the closed chamber 10 can flow into the telescopic chamber 211 via the permeable holes 2311, but any impurities are prevented from moving through the fixed piston 231.

The flexible member 233 is attached to the sidewall 2111 of the telescopic assembly 21 to separate the telescopic chamber 211 from the closed chamber 10. The flexible member 233 can be deformed due to the pressure exerted by the liquid in the closed chamber 10, to create a gap between the flexible member 233 and the sidewall 2111, such that any liquid in the closed chamber 10 can force its way into the telescopic chamber 211. In the illustrated embodiment, the flexible member 233 is a circular silicone mat, and the filter 235 is a metal mesh filter which functions as a large-scale filter of the liquid flowing into the telescopic chamber 211.

The drive assembly 25 includes a connecting pole 251 extending out of the telescopic assembly 21, a follower 253 fixed to the top end of the connecting pole 251, a driving member (not shown), a turntable 255 rotated by the driving member, and a drive rod 257 positioned on the turntable 255. The connecting pole 251 is positioned in the telescopic chamber 211, and can move up and down within the telescopic assembly 21. The second sealing assembly 31 is fixed to the bottom of the connecting pole 251.

In the illustrated embodiment, the follower 253 is substantially rectangular, and defines a restricting groove 2531. The follower 253 may be integrally formed with the connecting pole 251. The turntable 255 is adjacent to the follower 253, and the center of the turntable 255 is located on the longitudinal axis of the telescopic assembly 21. The turntable 255 has a circular flat surface 2551 which is substantially coplanar with a side surface of the follower 253, and can be rotated by the driving member. The drive rod 257 is positioned close to the circumference of the turntable 255, and has a drive end 2571. The drive end 2571 is slidably engaged in the restricting groove 2531 of the follower 253, such that the follower 253 can be moved up and down linearly via the circular motion of the drive rod 257.

The controller 27 includes a sensor 271 positioned beneath the surface of the liquid in the closed chamber 10. The controller 27 receives a plurality of signals as to the level of any liquid found in the closed chamber 10 from the sensor 271, and thereby determines the movements of the drive assembly 25.

The second sealing assembly 31 includes an action piston 311 fixed to the bottom of the connecting pole 251, and a flexible member 313.

The action piston 311 is cylindrical, and positioned between the liquid inlet 213 and the liquid discharge holes 215. The action piston 311 moves with the connecting pole 251. The action piston 311 includes a top surface 3111 and a sealing surface 3113. The sealing surface 3113 provides a moving seal against the sidewall 2111 of the telescopic assembly 21. Therefore, the telescopic chamber 211 is divided into a first chamber 2113 adjacent to the liquid inlet 213, and a second chamber 2115 communicating with the liquid discharge holes 215. The top surface 3111 defines a plurality of permeable holes 3115, so that any liquid in the second chamber 2115 can flow to the first chamber 2113 via the permeable holes 3115, but the permeable holes 3115 prevent any impurities from moving through the action piston 311. The flexible member 313 is sleeved on the connecting pole 251, and attached to the top surface 3111 of the action piston 311. The flexible member 313 has a waterproof surface 3131 away from the top surface 3111 and a sealing surface 3133 providing a constant seal against the sidewall 2111. The flexible member 313 can be deformed under the pressure exerted by the liquid in the first chamber 2113, thus allowing a gap to form between the sealing surface 3133 and the sidewall 2111, such that liquid can penetrate through the action piston 311 and flow into the second chamber 2115. In the illustrated embodiment, the flexible member 313 is a circular silicone mat.

In assembly of the drainage device 100, the flexible member 233 is attached to the fixed piston 231, and the fixed piston 231 and the flexible member 233 are positioned together in the telescopic assembly 21 above the liquid inlet 213. The fixed piston 231 is fixed in the telescopic assembly 21. The filter 235 is fixed above the liquid inlet 213 of the telescopic assembly 21. The flexible member 313 and the action piston 311 are sleeved in turn on the connecting pole 251, with the flexible member 313 attached to the top surface 3111 of the action piston 311. The telescopic assembly 21 is positioned in the closed chamber 10, with the liquid inlet 213 below the minimum level of the liquid. The flexible member 313 and the action piston 311 are inserted into the telescopic chamber 211 of the telescopic assembly 21, and the telescopic chamber 211 is thus divided into the first chamber 2113 and the second chamber 2115. The drive rod 257 is slidably engaged in the restricting groove 2531 of the follower 253.

Referring to FIGS. 1 and 2, in use, the closed chamber 10 is subjected to a predetermined degree of vacuum via the air pump, and liquid is sucked into the closed chamber 10 via the fluid channel 12. When the liquid level in the closed chamber 10 is below a predetermined level, the driving member does not actuate, and the follower 253 does not move. The action piston 311 and the flexible member 313 are located in the telescopic chamber 211 and adjacent to the liquid inlet 213, and thereby arriving at the first state of the drainage device 100 as shown in FIG. 2.

When the liquid level in the closed chamber 10 exceeds a predetermined level, the sensor 271 detects the level of the liquid, and generates a signal. The controller 27 transmits the signal to the driving member, and the driving member rotates the turntable 255. The drive rod 257 drives the follower 253 to rotate about the center of the turntable 255, and simultaneously, the drive rod 257 slides in the restricting groove 2531 of the follower 253, such that the connecting pole 251 can constantly slide in a reciprocating manner.

Figure 3:
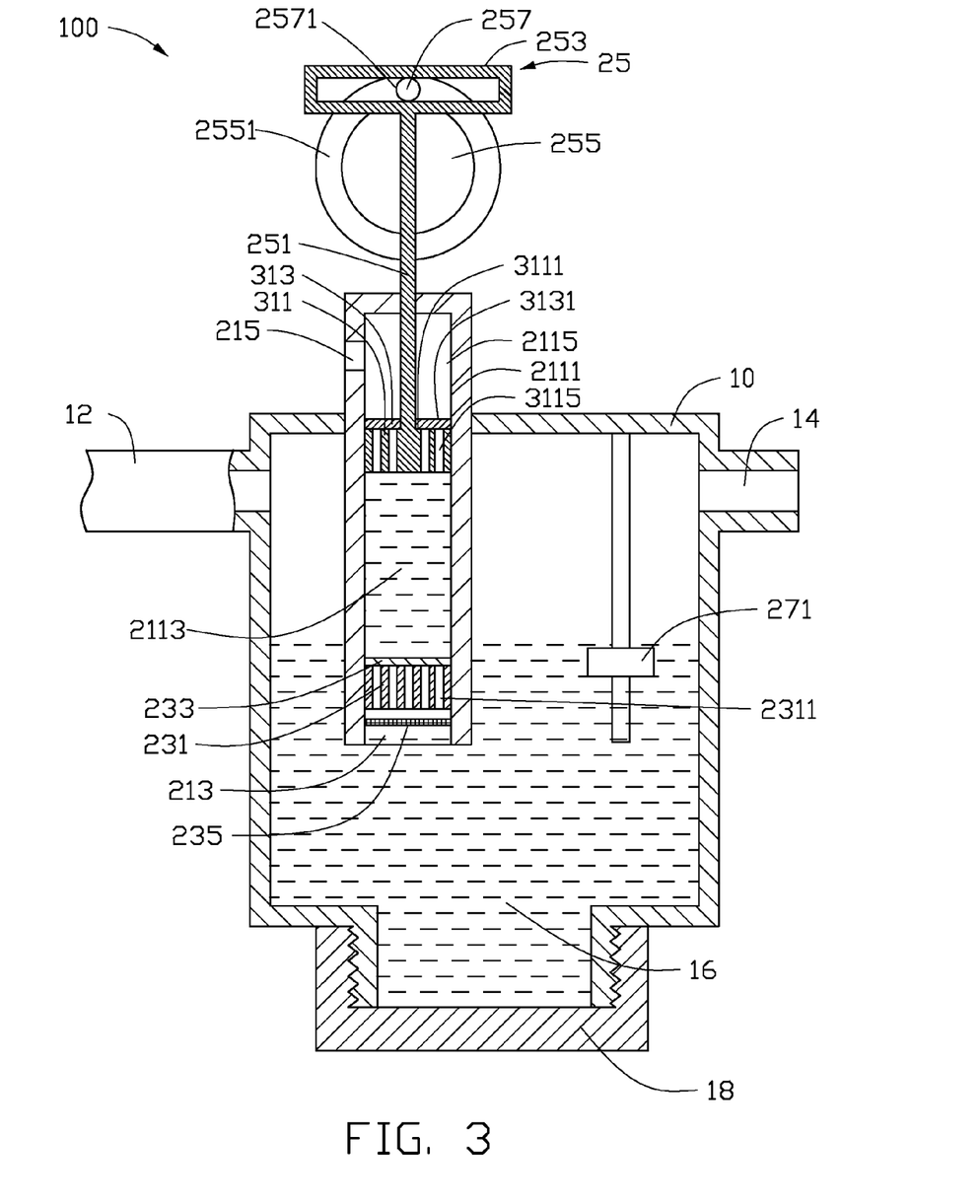
FIG. 3 is a sectional view of the drainage device of FIG. 2 operating in a second state.

When the follower 253 together with connecting pole 251 move upwards, the action piston 311 and the flexible member 313 slide in the telescopic chamber 211 away from the liquid inlet 213. When the drive rod 257 rotates to the top of the turntable 255, the drive end 2571 is located at the middle portion of the follower 253, and is aligned with the connecting pole 251. The action piston 311 and the flexible member 313 have moved a maximum distance upward relative to the first sealing assembly 23, and the drainage device 100 thus arrives in the second state as shown in FIG. 3.

When the drainage device 100 transitions from the first state to the second state, the connecting pole 251 together with the action piston 311 and the flexible member 313 move upward in the telescopic chamber 211, therefore, the volume of the first chamber 2113 increases, thereby, correspondingly reducing the air pressure in the first chamber 2113. Therefore, an air pressure difference is generated between the first chamber 2113 and the closed chamber 10, and thus the flexible member 233 is deformed under the air or liquid pressure. Therefore, a gap is generated between the flexible member 233 and the sidewall 211 of the telescopic assembly 21, such that the liquid in the closed chamber 10 moves through the filter 235 and the fixed piston 231, and is sucked into the first chamber 2113 because of the negative air pressure. Simultaneously, an air pressure difference is also created, between the lower air pressure in the first chamber 2113, and the higher pressure in the second chamber 2115. The flexible member 313 is pressed down on the action piston 311 and the side surface of the sidewall 211 of the telescopic assembly 21 due to the air pressure differential, and thus the liquid in the first chamber 2113, in the first state, cannot flow back into the second chamber 2115. When the drainage device 100 reaches the second state, the first chamber 2113 is filled with liquid, and the flexible member 233 is pressed flat, therefore, the liquid cannot escape again to the closed chamber 10 and is sealed in the first chamber 2113.

When the drainage device 100 transitions again from the second state to the first state, the connecting pole 251 together with the action piston 311 and the flexible member 313 move downward in the telescopic chamber 211, creating higher pressure in the first chamber 2113 and thus deformation of the flexible member 313. The liquid in the first chamber 2113 is pumped into the second chamber 2115 under the higher pressure. Then, on the next upward stroke of the connecting pole 251, the liquid in the second chamber 2115 will drain out of the second chamber 2115 via the liquid discharge holes 215, as the flexible member 313 is pressed flat by the weight of the liquid in the second chamber 2115.

As the drainage device 100 continuously moves or transitions between the first state and the second state, the liquid in the closed chamber 10 is discharged to the outside. When the liquid level in the closed chamber 10 again falls below the predetermined level, the sensor 271 generates a closing signal. The controller 27 transmits the closing signal to the driving member, and then the drainage device 100 stops. In addition, if there is some sediments which have accumulated at the bottom of the closed chamber 10, the sealing cover 18 can be opened to remove the sediments.

The flexible member 313 prevents the ingress of outside air into the first chamber 2113. That is, air from the outside cannot reach the inside of the closed chamber 10 at any time.

The central portion of the flexible member 313 may be made of metal, and is integrally formed with the connecting pole 251, and the circumferential portion of the flexible member 313 may be made of flexible material to allow deformation. This type of flexible member 313 can have a longer service life, and assist in preventing any axial deviation by the connecting pole 251 as a result of lateral forces being applied. The drive assembly 25 may be replaced by a linear drive motor, which can drive the connecting pole 251 in a straight line. In addition, the telescopic assembly 21 may define any number of discharge holes 215.

Figure 4:
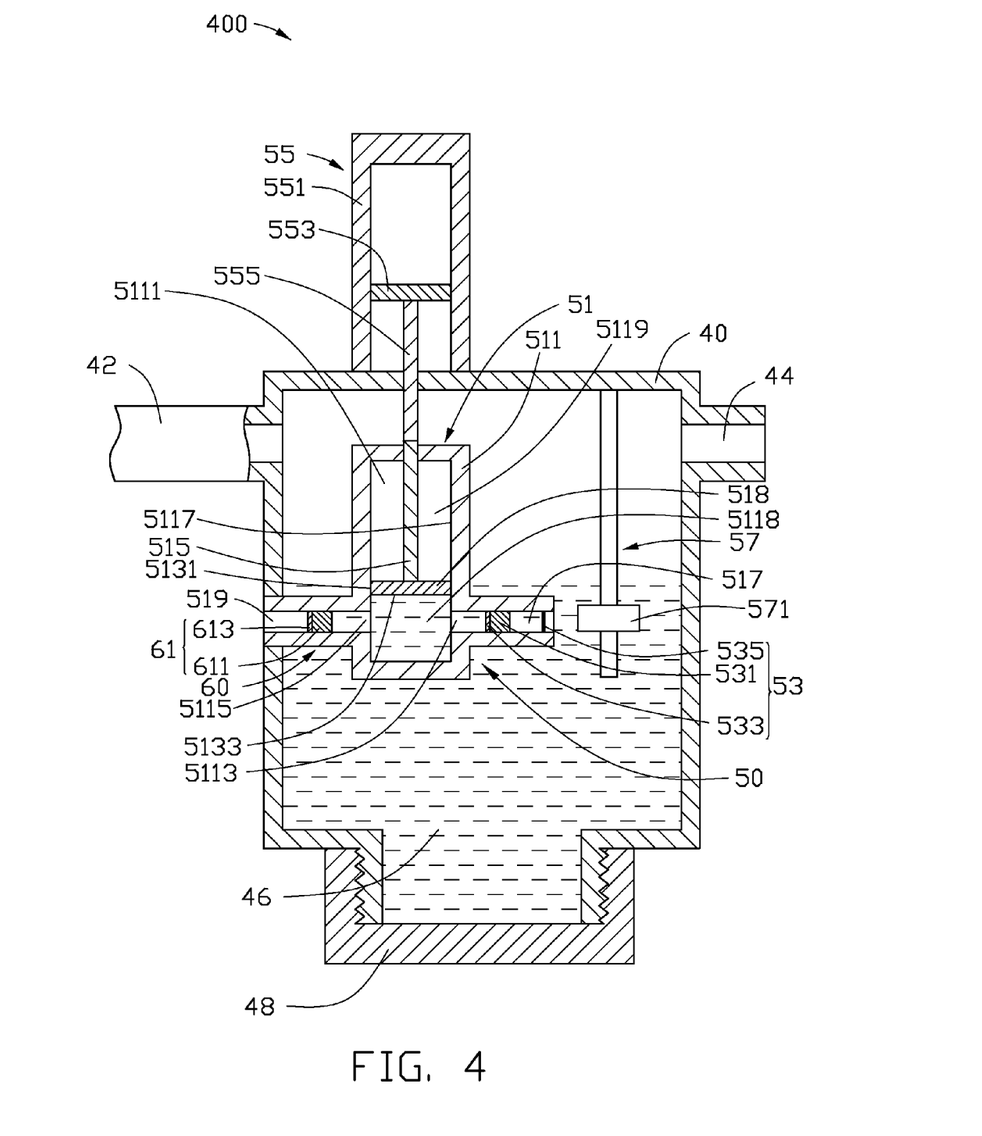
FIG. 4 is a sectional view of a second embodiment of a drainage device operating in a first state.

Referring to FIG. 4, a second embodiment of a drainage device 400 includes a closed chamber 40, a liquid pumping mechanism 50, and a liquid discharge mechanism 60. The liquid pumping mechanism 50 includes a telescopic assembly 51, a first sealing assembly 53, a drive assembly 55, and a controller 57. The liquid discharge mechanism 60 includes a second sealing assembly 61.

The closed chamber 40 defines a fluid channel 42 and a gas channel 44 in the top end, and a slag discharge hole 46 in the bottom end. The closed chamber 10 further includes a sealing cover 48 for sealing the slag discharge hole 46. The fluid channel 42 is used for liquid flow, and is equipped with a flow control valve (not shown). The gas channel 44 is connected to an air pump (not shown) for producing a certain degree of vacuum in the closed chamber 40.

The telescopic assembly 51 is positioned in the closed chamber 40, and includes a main body 511, an action piston 513 positioned in the main body 511, and a connecting pole 515 connected to the action piston 513, a first channel 517, and a second channel 519 opposite to the first channel 517. The main body 511 is substantially cylindrical, and defines a telescopic chamber 5111. One end of the main body 511 defines a liquid inlet 5113 and a discharge hole 5115 communicating with the telescopic chamber 5111, and the other end of the main body 511 is closed. The liquid inlet 5113 is opposite to the discharge hole 5115. The first channel 517 communicates with the liquid inlet 5113, and the second channel 519 communicates with the discharge hole 5115. The first channel 517 is below the level of the liquid of the closed chamber 10, and can allow the liquid in the closed chamber 40 to flow into the telescopic chamber 5111. The liquid in the telescopic chamber 5111 may be discharged outside the telescopic chamber 5111 via the second channel 519.

The action piston 513 is movably received in the telescopic chamber 5111, and forms a sealing surface 5131 attached to a sidewall 5117, and a resisting surface 5133 adjacent to the liquid inlet 5113. The action piston 513 separates the telescopic chamber 5111 into a first chamber 5118 and a second chamber 5119. The first chamber 5118 communicates with the liquid inlet 5113 and the discharge hole 5115. The action piston 513 is fixed to the bottom of a connecting pole 515, which extends through the closed end of the main body 511.

The first sealing assembly 53 is positioned in the first channel 517, and includes a fixed piston 531, a flexible member 533, and a filter 535. The flexible member 533 and the filter 535 are positioned on opposite sides of the fixed piston 531, and the flexible member 533 is closer to the liquid inlet 5113. The fixed piston 531 defines a plurality of permeable holes (not shown), so that any liquid in the closed chamber 40 can flow into the telescopic chamber 5111 via the permeable holes. The flexible member 533 is attached to the inner surface of the first channel 517 in order to seal the first channel 517. In the illustrated embodiment, the flexible member 533 is a circular silicone mat, and the filter 535 is a metal mesh filter which functions as a large-scaled filter of the liquid flowing into the telescopic chamber 5111.

The drive assembly 55 includes a receiving body 551, a drive piston 553 movably received in the receiving body 551, and a drive rod 555. The receiving body 551 is positioned on the outer surface of the closed chamber 40. The drive rod 555 connects the drive piston 553 to the connecting pole 515.

The controller 57 includes a sensor 571 positioned beneath the surface of the liquid of the closed chamber 40. The controller 57 receives a plurality of signals as to the level of any liquid in the closed chamber 40 from the sensor 571 and determines the movements of the drive assembly 55.

The second sealing assembly 61 is positioned in the second channel 519, and includes a fixed piston 611 and a flexible member 613. The fixed piston 611 has a similar structure to that of the fixed piston 531. The flexible member 613 has a similar structure to that of the flexible member 533.

In assembly of the drainage device 400, the telescopic assembly 51 is positioned in the closed chamber 40, with the liquid inlet 5113 and the discharge hole 5115 below the level of any liquid in the closed chamber 40. The first sealing assembly 53 is positioned in the first channel 517, and the second sealing assembly 61 is positioned in the second channel 519. The fixed piston 531 is fixed to the inner surface of the first channel 517. The central portion of the flexible member 533 is fixed to the side of the fixed piston 531 adjacent to the liquid inlet 5113. The filter 535 is positioned in the first channel 517 and away from the flexible member 533. The fixed piston 611 is fixed to the inner surface of the second channel 519. The central portion of the flexible member 613 is fixed to the side of the fixed piston 611 away from the discharge hole 5115.

The drive assembly 55 is fixed on the outer surface of the closed chamber 40. The drive rod 555 connects the drive piston 553 to the connecting pole 515. The controller 57 is positioned in the closed chamber 40.

Figure 5:
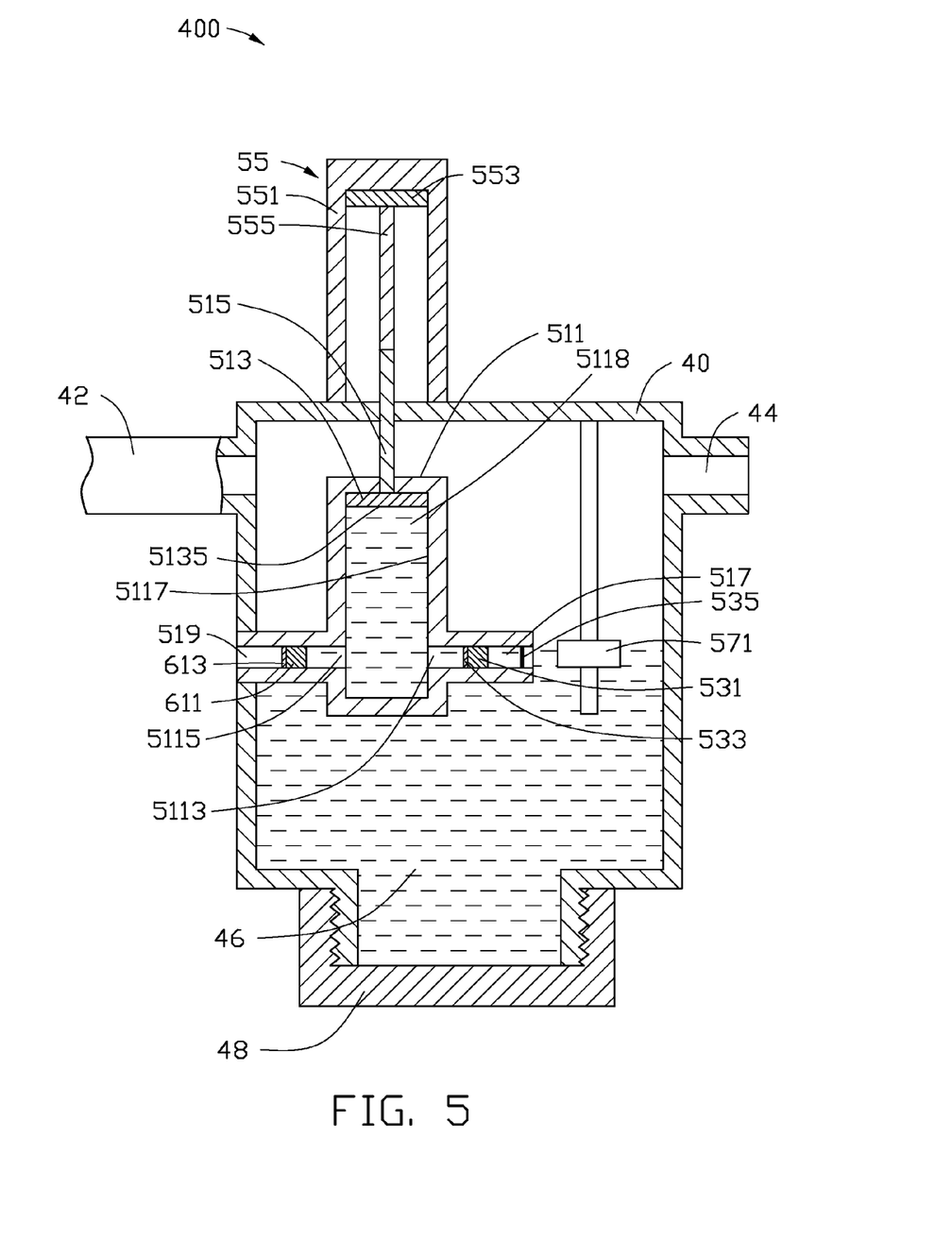
FIG. 5 is a sectional view of the drainage device of FIG. 4 in the first state with a telescopic chamber full of liquid.

Referring to FIGS. 4 and 5, in use, the closed chamber 40 is subjected to a predetermined degree of vacuum via the air pump, and liquid is sucked into the closed chamber 40 via the fluid channel 42. When the liquid level in the closed chamber 40 exceeds a predetermined level, the sensor 571 generates a signal. The controller 57 transmits a start signal to the drive assembly 55, and then the drive assembly 55 starts to work. The drive rod 555 may drive the connecting pole 515 to move upwards. As a result, the action piston 513 slides in the telescopic chamber 5111 away from the liquid inlet 5113, and then the volume of the first chamber 5118 increases, thereby correspondingly reducing the air pressure in the first chamber 5118. Therefore, an air pressure differential is generated between the first chamber 5118 and the closed chamber 40, and thus the flexible member 533 is deformed under the air or liquid pressure. A gap is generated between the flexible member 533 and the first channel 517, such that the liquid in the closed chamber 40 moves through the filter 535 and the fixed piston 531, and is sucked into the first chamber 5118 because of the negative air pressure. The drainage device 400 is thus arriving in the first state.

Figure 6:
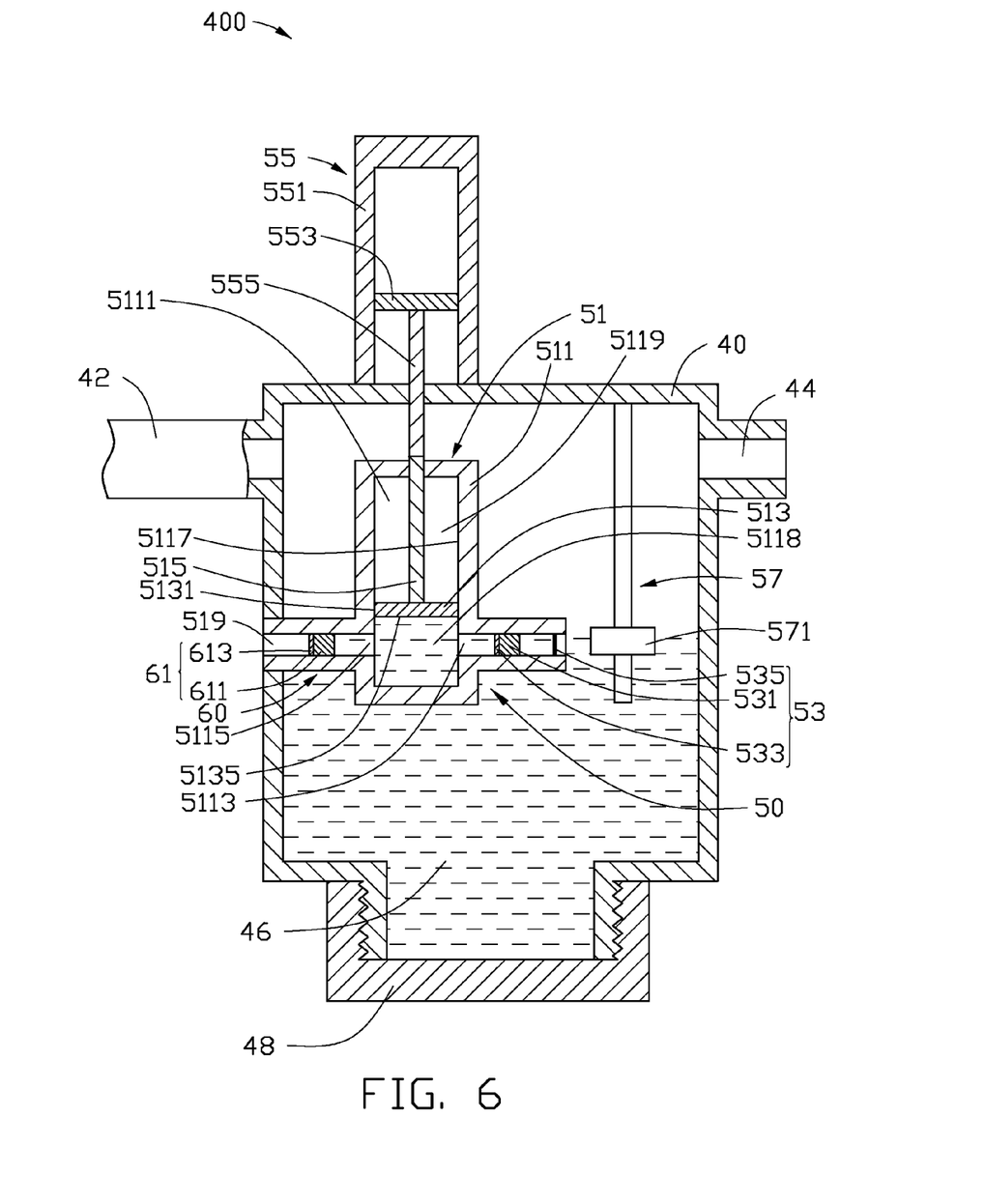
FIG. 6 is a sectional view of the drainage device of FIG. 4 operating in a second state.

When the action piston 513 has moved a maximum distance upward relative to the liquid inlet 5113, the first chamber 5118 is filled with liquid as shown in FIG. 5. Referring to FIG. 6, after the first chamber 5118 is filled with liquid, the drive rod 555 drives the connecting pole 515 to move downwards. As a result, the action piston 513 slides in the telescopic chamber 5111 towards the liquid inlet 5113, the volume of the first chamber 5118 decreases, and correspondingly the volume of the second chamber 5119 increases. Therefore, the liquid pressure in the first chamber 5118 increases, and the flexible member 533 is tightly pressed against the fixed piston 531, and the flexible member 613 is deformed under the liquid pressure. As a result, the first channel 517 is sealed by the flexible member 533, and the second channel 519 is opened due to a gap formed between the flexible member 613 and the second channel 519. Then, the drainage device 400 is in the second state, and the liquid in the first chamber 5118 is discharged to the outside via the second channel 519.

As the drainage device 400 continuously moves between the first state and the second state, any excess liquid in the closed chamber 40 is drained to the outside. When the liquid level in the closed chamber 40 again falls below the predetermined level, the sensor 571 generates a closing signal. The controller 57 transmits the closing signal to the driving member, and then the drainage device 400 stops. In addition, if there is some sediments which have accumulated at the bottom of the closed chamber 40, the sealing cover 48 can be opened to remove the sediments from the closed chamber 40. The connecting pole 515 and the drive rod 555 can be integrally formed.

When the liquid of the closed chamber 40 flows into the first chamber 5118 via the first channel 517, the flexible member 613 seals the second channel 519. When the liquid of the first chamber 5118 flows to the outside via the second channel 519, the flexible member 533 seals the first channel 517. Therefore, air from the outside cannot reach the inside of the closed chamber 40 at any time.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A drainage device, comprising:
    a closed chamber filled with an amount of liquid and gas, the closed chamber defining a fluid channel and a gas channel in a top end, and a slag discharge hole in the bottom end thereof;
    a liquid pumping mechanism pumping the liquid in the closed chamber, and preventing the liquid in the liquid pumping mechanism from flowing back to the closed chamber, the liquid pumping mechanism comprising a drive assembly, a telescopic assembly, and a first sealing assembly, the telescopic assembly defining a telescopic chamber, the driving assembly comprising a connecting pole; and
    a liquid discharge mechanism discharging the liquid in the liquid pumping mechanism to outside, and preventing outside air from entering into the closed chamber, the liquid discharge mechanism comprising a second sealing assembly, the second sealing assembly comprising an action piston fixed to an end of the connecting pole and a flexible member sleeved on the connecting pole and attached to the action piston;
    wherein the first sealing assembly and the second sealing assembly are received in the telescopic assembly and a major portion of the telescopic assembly is positioned within the closed chamber, the drive assembly drives the action piston to move, thereby pumping the liquid in the closed chamber into the telescopic chamber through the first sealing assembly, and discharging to the outside through the second sealing assembly.

2. The drainage device of claim 1, wherein the telescopic assembly further defines a plurality of liquid discharge holes in a sidewall thereof.

3. The drainage device of claim 1, wherein the action piston defines a plurality of permeable holes.

4. The drainage device of claim 1, wherein the connecting pole extends out of the telescopic assembly, the drive assembly further comprises a follower fixed to an end of the connecting pole extending out of the telescopic assembly, a turntable, and a drive rod positioned on the turntable, and the drive rod is connected to the follower.

5. The drainage device of claim 4, wherein the follower defines a restricting groove, and the drive rod has a drive end slidably received in the restricting groove.

6. The drainage device of claim 1, wherein the first sealing assembly comprises a fixed piston fixed in the telescopic chamber, and a flexible member attached to the fixed piston.

7. The drainage device of claim 6, wherein the first sealing assembly further comprises a filter fixed in the telescopic chamber and opposite to the fixed piston.

8. The drainage device of claim 7, wherein the flexible member of the first sealing assembly or the second sealing assembly is a circular silicone mat, and the filter is a metal mesh filter.

9. The drainage device of claim 1, wherein the action piston comprises a sealing surface slideably engaged with a sidewall of the telescopic assembly, thereby separating the telescopic chamber into a first chamber and a second chamber.

10. The drainage device of claim 1, wherein the drive assembly comprises a receiving body, a drive piston movably received in the receiving body, and a drive rod; the receiving body is positioned on the outer surface of the closed chamber, and the drive rod connects the drive piston to the connecting pole.

11. The drainage device of claim 1, further comprising a controller, wherein the controller has a sensor for detecting liquid level in the closed chamber, and controls the movement of the drive assembly.

12. The drainage device of claim 1, wherein the closed chamber further comprises a sealing cover for sealing the slag discharge hole.

* * * * *